US006789724B2

(12) United States Patent
Cordier et al.

(10) Patent No.: US 6,789,724 B2
(45) Date of Patent: Sep. 14, 2004

(54) WELDING APPARATUS AND METHOD

(75) Inventors: Bernard J. Cordier, Perigneux (FR); Didier J. M. Quoy, Saint Chamond (FR); Jacobus P. M. Hermans, Tilburg (NL); Johannes L. L. A. van den Broek, Tilburg (NL)

(73) Assignee: Erico International Corporation, Solon, OH (US)

( * ) Notice: Subject to any disclaimer, the term of this patent is extended or adjusted under 35 U.S.C. 154(b) by 88 days.

(21) Appl. No.: 10/189,132

(22) Filed: Jul. 2, 2002

(65) Prior Publication Data

US 2003/0006272 A1 Jan. 9, 2003

Related U.S. Application Data

(60) Provisional application No. 60/303,572, filed on Jul. 6, 2001.

(51) Int. Cl.[7] ........................... B23K 31/02; B23K 1/00; B22D 19/00
(52) U.S. Cl. ....................... 228/234.3; 228/33; 164/108; 164/526
(58) Field of Search .............................. 228/234.3, 33, 228/198, 199, 235.1; 164/54, 111–113, 520, 529

(56) References Cited

U.S. PATENT DOCUMENTS

| | | | |
|---|---|---|---|
| 3,113,359 A | | 12/1963 | Burke |
| 3,234,603 A | * | 2/1966 | Leuthy et al. ............... 164/108 |
| 3,806,104 A | * | 4/1974 | Clarke ......................... 267/113 |
| 3,971,117 A | * | 7/1976 | Osterhout et al. ........... 249/174 |
| 4,658,886 A | * | 4/1987 | Carlson et al. .............. 164/526 |
| 4,881,677 A | * | 11/1989 | Amos et al. ................... 228/33 |
| 5,533,662 A | | 7/1996 | Stidham et al. |
| 5,660,317 A | | 8/1997 | Singer et al. |
| 5,692,734 A | | 12/1997 | Aldredge, Sr. |
| 5,829,510 A | | 11/1998 | Fuchs |

FOREIGN PATENT DOCUMENTS

| | | | |
|---|---|---|---|
| EP | 0802013 A1 | * | 10/1997 |
| EP | 0 879 569 A1 | | 10/1998 |
| EP | 0 875 330 A1 | | 11/1998 |

* cited by examiner

Primary Examiner—L. Edmondson
(74) Attorney, Agent, or Firm—Renner, Otto, Boisselle & Sklar; John W. Renner

(57) ABSTRACT

An exothermic welding system uses compressible layers of disposable refractory batting or gaskets to form a weld chamber for parts to be welded. The parts to be welded are layered with the batting between a base and a crucible platen supported by a clamping fixture. The layered batting is provided with the holes intersecting the parts to be welded. The holes form the weld chamber. The crucible platen is provided with a chamber for the exothermic material which when ignited forms molten metal which flows through a tap hole into the weld chamber. When the weld is made, the fixture is opened and the batting is discarded. The invention is also the method of forming the welded connection by compressing the layered batting and the parts to be welded to form the disposable weld chamber enabling a simpler and lower cost welding system to make a wide variety of connections not requiring a large inventory of special and costly refractory mold parts.

35 Claims, 4 Drawing Sheets

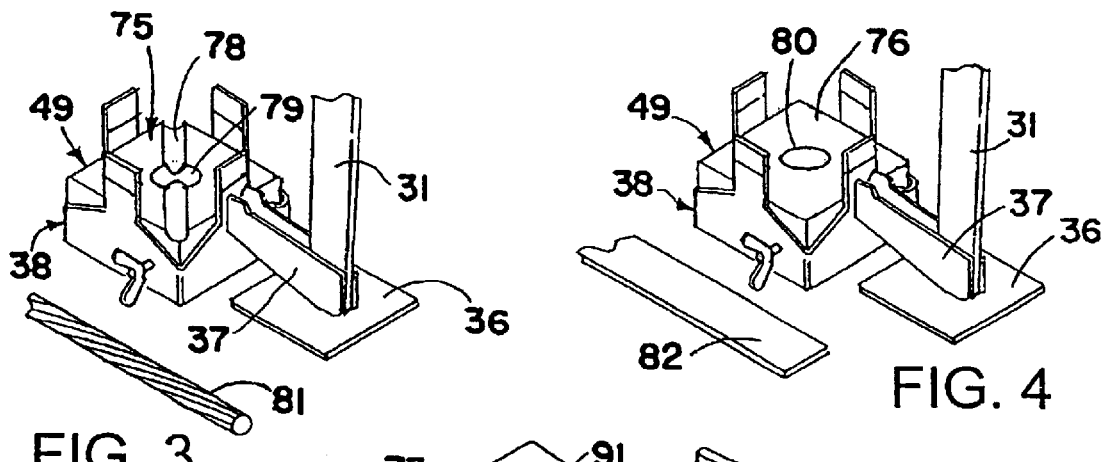
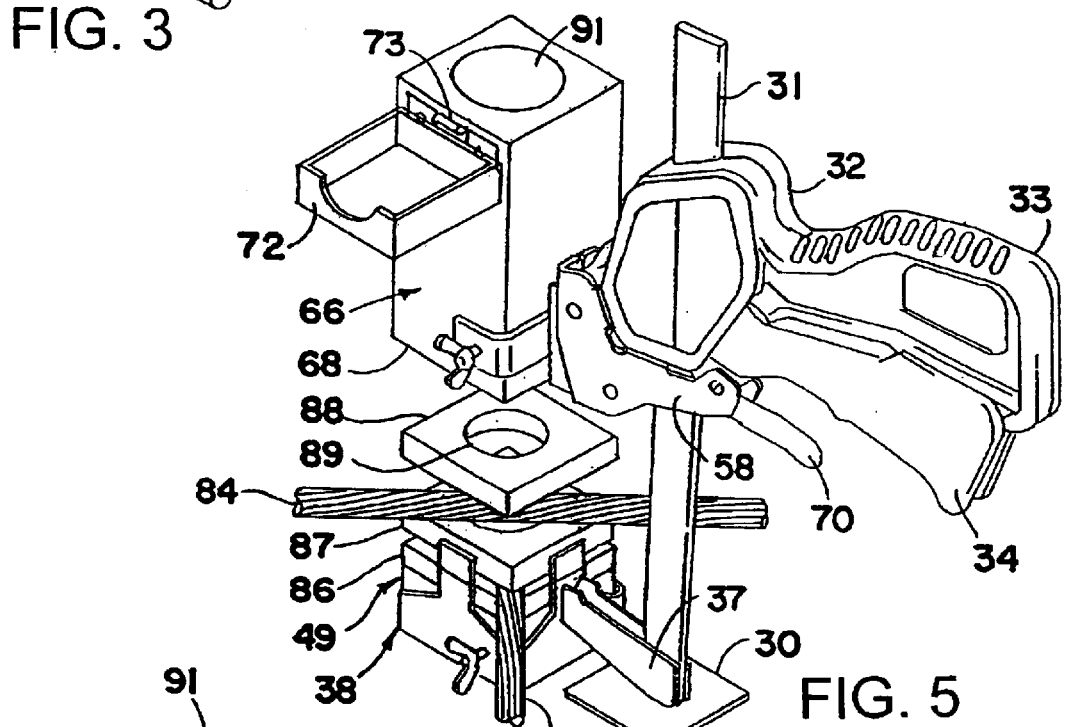
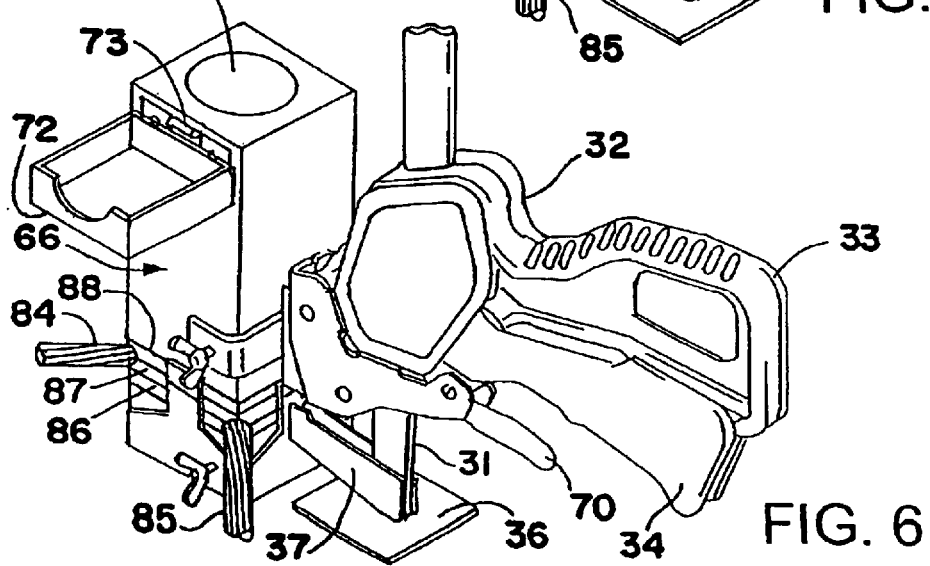

WELDING APPARATUS AND METHOD

This application claims the benefit of U.S. Provisional Application No. 60/303,572 filed Jul. 6, 2001.

DISCLOSURE

This invention relates generally as indicated to a welding apparatus and method and more particularly to an exothermic welding apparatus for welding a variety of objects such as electrical conductors in the form of cable, rod, strip, braid, bars, tape and the like, and also in a variety of sizes, as well as a process for economically forming good high ampacity, low resistance electrical connections for such objects.

BACKGROUND OF THE INVENTION

Exothermic welding has become recognized as a preferred way to form top quality high ampacity, low resistance electrical connections.

Exothermic welded connections are immune to thermal conditions which can cause mechanical and compression joints to become loose or corrode. They are recognized for their durability and longevity. The process fuses together the parts or conductors to provide a molecular bond, with a current carrying capacity equal to that of the conductor. Such connections are widely used in grounding systems enabling the system to operate as a continuous conductor with lower resistivity.

Reusable refractory molds usually made of graphite or the like are widely used with exothermic welding materials to make a wide variety of such high ampacity, low resistance electrical connections. Typical of such molds are those sold under the well-known trademark CADWELD® by Erico International of Solon, Ohio, U.S.A.

The reusable molds are two or more part molds usually opened and closed and held together by toggle clamps. The mold parts have faces which abut at a parting plane in which are formed recesses forming the various cavities and passages when the parts are clamped together. Typically, the mold parts form a weld chamber, which usually includes a riser which may be the enlarged lower end of a tap hole passage which extends from the top of the mold to the weld chamber.

The parts to be welded enter the weld chamber through sleeving passages which extend from outside the mold to the chamber. Such passages usually extend horizontally.

A crucible normally sits on top of the assembled mold parts. The crucible includes a chamber holding the exothermic material on top of a fusible disk. A sprue or tap hole below the disk communicates with the top of the tap hole of the mold. When a measured and controlled quantity of exothermic material is ignited, it forms molten metal which fuses the disk permitting the molten metal to run downwardly into the weld chamber to weld any parts exposed to the chamber. Any slag forms on top of the weld metal and normally accumulates in the riser. After the weld cools, the mold is disassembled and any slag removed. The molds and crucible are cleaned for reuse.

Such molds can be rather intricate and are not insignificant in cost. More importantly, for each type of connection, a different mold assembly is normally required. These essentially single-use molds create an extremely large number or inventory of molds, and makes the storage, transportation and selective use of such molds both costly and burdensome. While some mold sets may accommodate different size conductors, usually with shims, sleeving or packing around smaller conductors in larger passages, such shims or sleeving contribute to the wear of the molds shortening their useful lives. All of the above contributes to the cost of making such high quality connections. Because of such costs, users and owners may select less expensive but less efficient weld connections and connections of lower quality.

Accordingly, it is desirable to maintain the cost of the apparatus and methods for making such exothermic connections as low as possible. This may ideally be accomplished by eliminating the formed or machined refractory molds surrounding and containing the parts to be joined.

SUMMARY OF THE INVENTION

The welding apparatus for forming weld connections includes a base against which is positioned a layered or sandwiched arrangement of refractory batting or gaskets and the parts to be connected. Each batting has a hole intersecting the parts to be connected. A platen is pressed against the layered arrangement to compress the batting around the parts to be connected with the holes in the batting forming the weld chamber. The platen is preferably part of an exothermic welding crucible in which a charge of exothermic material is ignited to form the weld metal to flow through a tap hole into the weld chamber to form the weld connection. Two or more layers of batting may be used depending on the type of connection being formed. After the weld connection is formed, the base and platen crucible are separated and the batting is discarded.

Supporting the base and platen crucible for opening and pressure closing movement is a clamp fixture to which the base and platen are secured. The base is a rectangular block having different patterns on opposite sides and may be flipped over depending on the type of weld connection being made. The fixture supports the base so that the parts may extend diagonally across the block and the batting which is of the same rectangular configuration.

The invention also is a method of forming welded connections, which includes the steps of layering the batting and parts to be welded against the base with the batting layers each having a hole intersecting the parts to be welded, and compressing the layered batting and parts against the base to seal the parts and form a sealed weld chamber. Molten metal is then introduced into the weld chamber and the connection is formed. When released, the batting is discarded.

In this manner, a wide variety of weld connections can be made without special refractory weld chamber mold blocks so widely subject to the inventory and wear problems noted above. In this manner, the same quality weld connections can be made much more easily either in the field or in the shop and at much reduced cost.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 3 is a view of the base having one exposed surface suitable for connecting round parts such as the illustrated cable or rod;

FIG. 4 is a view like FIG. 3 showing the base flipped over and the exposed surface suitable for connecting the illustrated flat strip or tape;

FIG. 5 is a view like FIG. 2 showing the refractory batting and parts being layered between the open crucible platen and base;

FIG. 6 is a view like FIG. 5 showing the clamp closed and the batting and parts compressed;

DETAILED DESCRIPTION OF THE PREFERRED EMBODIMENTS

Figure 1:
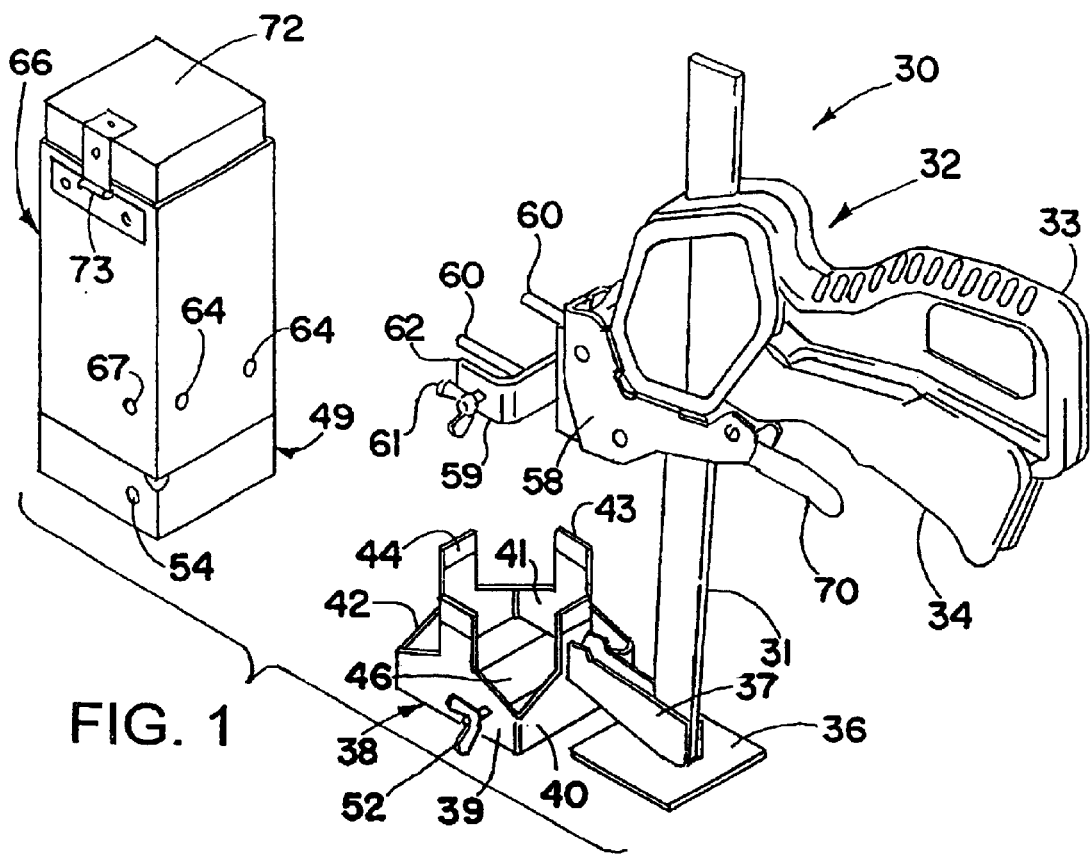
FIG. 1 is an isometric exploded view of the fixture as well as the crucible platen and base, but not assembled.
Figure 2:
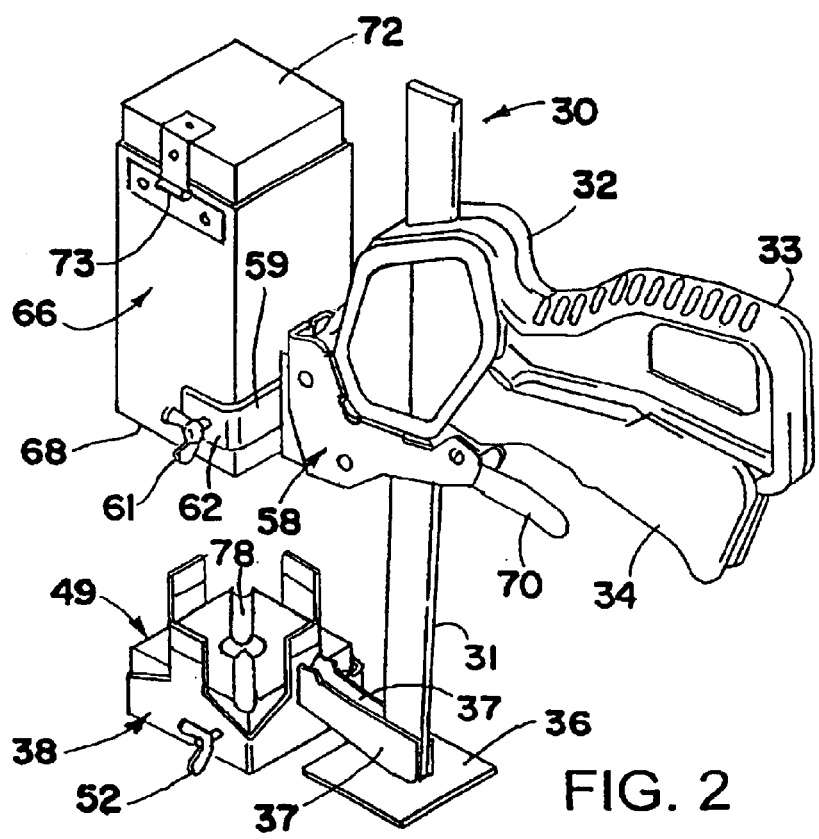
FIG. 2 is a similar view, but with the parts assembled to the fixture.

Referring initially to FIGS. 1 and 2, there is illustrated generally at 30 a clamp fixture which includes an upstanding ratchet bar 31, and a ratchet mechanism housing 32 which includes a projecting handle 33. Pivoted in the housing is a clamp ratchet actuating lever 34. The operator by squeezing the handle 33 and the lever 34 may ratchet the housing 32 downwardly along the ratchet bar 31.

The bottom of the ratchet bar 31 is provided with a support base plate 36. Just above the plate, the ratchet bar 31 is provided with two forwardly projecting arms indicated at 37 which support forwardly projecting base bracket assembly 38. The base bracket assembly 38 is formed by four upwardly extending side plates shown at 39, 40, 41 and 42, each of which has an upwardly extending or narrow finger 43, the outer tip of which indicated at 44 may be flared slightly outwardly. The two side plates 39 and 41 are joined at the bottom by transverse bottom plate or strap 46. The base bracket assembly then forms an upwardly opening retainer for refractory base block 49 which has the same profile as the bracket assembly. In FIG. 1, the refractory base block is shown out of the base bracket assembly, while in FIG. 2, the base block 49 is secured in the base bracket assembly. In order to secure the block in place, the sidewall plate 39 is provided with thumb screw shown at 52. This thumb screw projects into hole 54 in the sidewall of the base block 49 and, when tightened, secures the base block in place as shown in FIG. 2.

The base supporting plate 36 together with the forwardly projecting base bracket assembly 38 provide a stable supporting platform for the fixture assembly so that it will remain in its upright condition on substantially any relatively smooth surface without requiring the operator to stabilize the fixture the manually.

Secured below the ratchet housing 32 is an upper bracket assembly 58 to the front of which is secured an L-shaped bracket plate 59. Projecting from the front of the bracket are two pins 60 which are parallel to each other. A thumb screw 61 is provided in the short forwardly projecting leg 62 of the bracket. The prongs or pins 60 project into the holes 64 of crucible platen 66 while the thumb screw 61 fits in the hole 67 in the side of the crucible platen 66. In this manner, the crucible platen may be secured to the upper bracket assembly 58 and when secured is in alignment with the base block 49 supported by the base bracket assembly. The crucible platen is supported so that the bottom platen surface indicated at 68 projects below the bracket 59 and is aligned with the base block 49 in the fixture assembled condition.

The upper bracket assembly also includes a pivoted ratchet release trigger illustrated at 70 by which the ratchet mechanism may be released and the entire upper assembly may be elevated away from the base block. Also, as seen in FIGS. 1 and 2, the crucible platen 66 is provided with a top lid 72 secured to the crucible by the hinge assembly 73.

Referring now to FIGS. 3 and 4, it will be seen that the base block 49 is provided with opposite surfaces 75 and 76 which are shown in FIGS. 3 and 4, respectively. In FIG. 3, the surface 75 is the top surface while the surface 76 is the bottom surface. In FIG. 4, the base block has simply been flipped over so that the bottom surface 76 is now on top. The two surfaces are each provided with a pattern, but the pattern is slightly different. The rectangular or square block surface 75 is provided with a diagonal almost semi-circular groove 78, which intersects a center almost semi-spherical depression 79. As seen in FIG. 4, the other surface 76 is provided simply with a center almost semi-spherical depression 80. As illustrated in FIG. 3, the pattern formed in the surface 75 is designed to facilitate the welding of round parts such as the cable illustrated at 81 while the single center depression 80 in the surface 76 is designed to facilitate the welding of flat strap, strip or tape parts illustrated at 82. Although the base block in the illustrated embodiment has only two opposite surfaces, it will be appreciated that the base block may be formed as a cube and that each of the six faces of the cube may be provided with patterns facilitating the welding of different parts.

Referring now to FIGS. 5 and 6, there is illustrated the formation of a welded connection between the cable conductors 84 and 85. With the fixture open, the cable conductors are layered on the base block 49 with layers of refractory batting indicated at 86, 87 and 88. The layering is obtained by placing the refractory batting 86 next to the base block, then the cable conductor 85, then the batting 87, then the cable conductor 84, and then the top batting 88. The batting sections may have the same rectangular or square profile as the base and may readily be stacked with the parts to be welded therebetween. The conductors, as illustrated, are preferably positioned diagonally of the base block and batting intersecting the batting holes 89. The upstanding guide fingers of the base bracket assembly 38 accommodate this positioning of the conductors. It may be appreciated that the conductors may be considerably longer than the those illustrated since the conductors do not have to be cut prior to the welding operation. The apparatus and method for welding the conductors may be readily performed either in the shop or in the field.

Each of the batting or gasket sections may be made from an environmentally acceptable high temperature glass or other refractory fiber felt having a density of about 128 kg/m³. Typically, the gasket felt or blanket will have a high loft and may be, for one set of welds, a square configuration of about 60×60 millimeters with a 24 millimeter hole in the center. This profile is similar to the profile of the bottom base block and also the platen bottom surface 68 of the crucible. However, other profiles may be used such as disks or ovals. For many connections, only two gaskets may be required. For some such as that illustrated, three or more gaskets or batting sections may be used.

With the batting and parts to be welded layered as illustrated in FIG. 5, the operator may then simply grip the lever 34 and squeeze. Repeated squeezing drives the ratchet clamp down with the desired pressure as shown in FIG. 6 clamping and compressing the parts together. The three layers of batting illustrated in FIG. 6 have been substantially compressed forming a disposable weld chamber between the base block 49 and the bottom platen surface 68 of the crucible 66. With the clamp closed and the layered batting and parts compressed, the fixture now has the parts in position to form the weld. The lid 72 of the crucible is opened.

Figure 7:
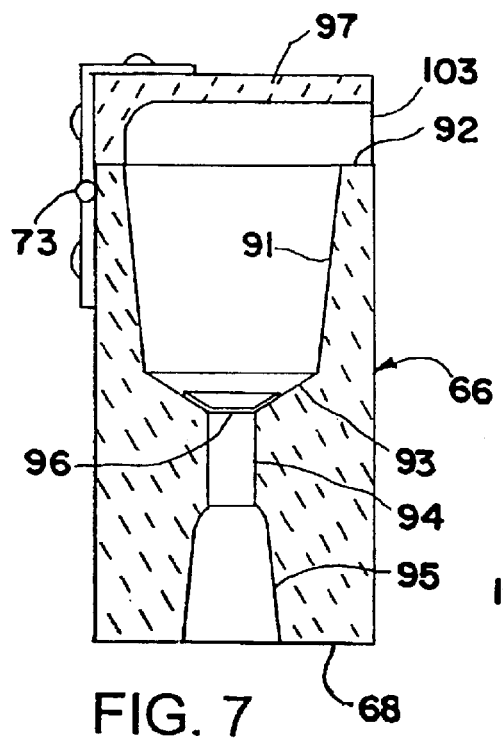
FIG. 7 is a vertical section through the crucible platen showing a different type of lid closed and a metal disk in place.
Figure 8:
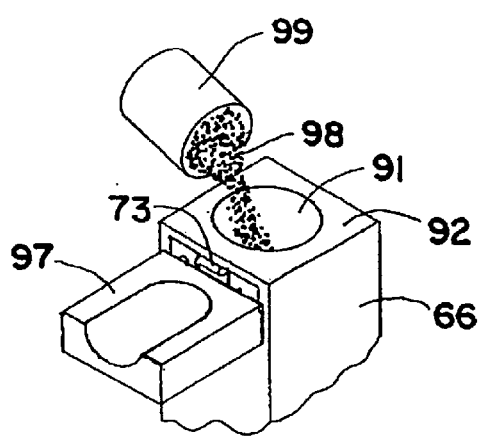
FIG. 8 is a fragmentary isometric view showing the crucible being charged with the exothermic material.
Figure 9:
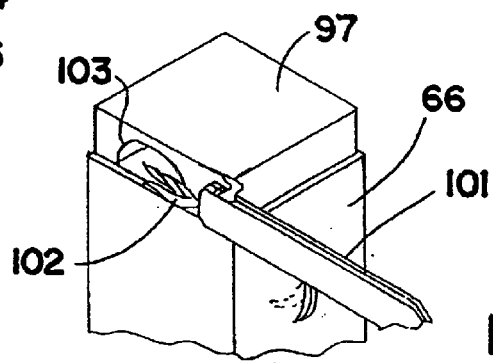
FIG. 9 is a similar view showing the ignition of the exothermic material.

Referring now to FIGS. 7, 8 and 9, it will be seen that the crucible 66 may be formed from a solid block of refractory material such as graphite or the like. It includes an exothermic material chamber 91, which opens at the top 92. The inverted slightly conical chamber 91 includes a bottom conical seat 93 which communicates with a tap hole 94 entering into riser chamber 95 which extends to the bottom or platen surface 68. Before exothermic material is charged into the chamber 91, the tap hole is closed by a metal disk illustrated at 96. The lid 97 shown in FIGS. 7, 8 and 9 may be machined from a solid block and is slightly different than the lid 72 seen in FIGS. 5 and 6. The lid, however, may be secured to the top of the crucible for the same hinging action by the same or similar hinge 73.

If the crucible is made of graphite, the graphite components should be preheated to remove any moisture. With the disk in the bottom of the crucible section, the weld metal illustrated at 98 is placed in the chamber 91. The weld metal may be contained in a pre-measured amount in the container 99 with the exothermic materials in the top of the container and a starting compound in the bottom. Thus, when the materials are dumped into the crucible chamber, the starting compound will be on top.

As illustrated in FIG. 9, the exothermic materials may be ignited with a spark gun illustrated at 101. The spark 102 produced by the gun is aimed at the opening 103 in the lid from the side. In accordance with the usual CADWELD® process, a starting compound ignites the exothermic materials and the reaction proceeds downwardly creating molten metal with any slag rising to the top. The molten metal fuses the disk 96 and the molten metal drops through the tap hole 94, the riser chamber 95, and into the weld chamber formed by the holes in the refractory batting. Any slag on top will project upwardly into the riser chamber and may be removed from the weld after it is formed.

Figure 10:
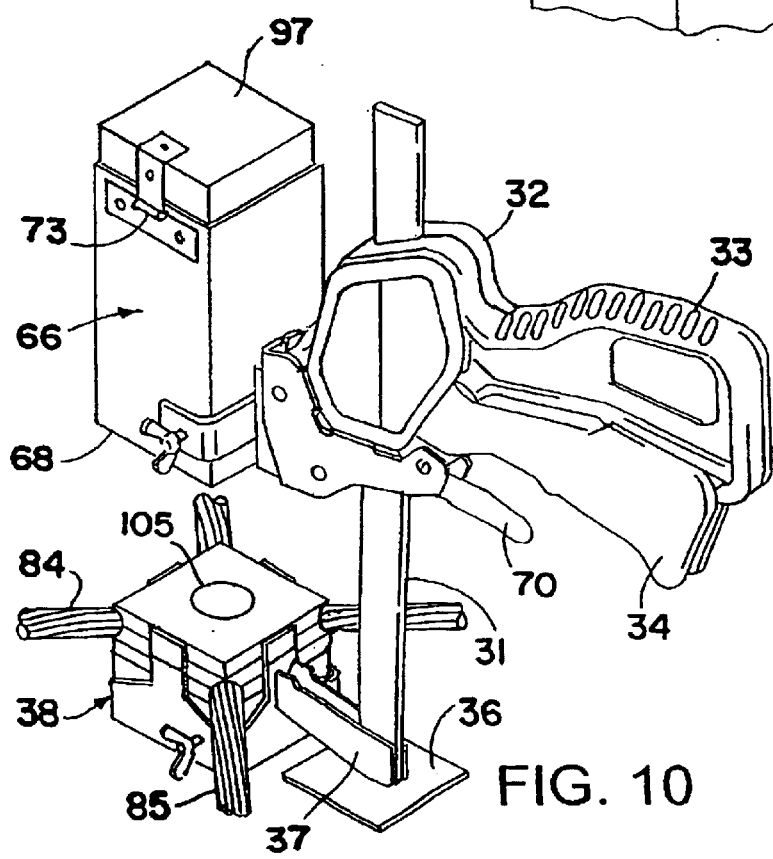
FIG. 10 is a view of the fixture opened after the weld connection has been formed.

After the weld is formed and cooled sufficiently, the release trigger 70 is actuated and the fixture opened as seen in FIG. 10. The top of the formed weld is shown at 105 and any projection of slag or excess metal contained in the riser chamber may be removed. With the fixture open, the welded connection is removed and the refractory batting forming the weld chamber is removed and discarded. The crucible platen may be cleaned for re-use and with the fixture open, the apparatus is then ready to form another weld connection.

Figure 11:
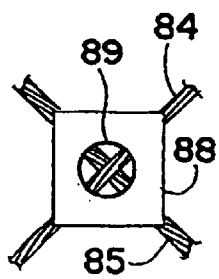
FIGS. 11 and 12 are top plan views of the parts and the batting to show the parts to be joined intersecting the hole in the batting forming the weld chamber.
Figure 12:
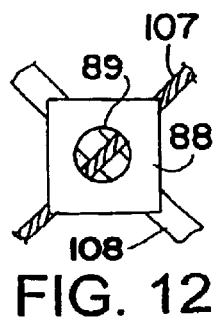

With reference now to FIGS. 11 and 12, it will be seen that the refractory batting 88 and the central hole 89 is arranged so that the hole 89 in each batting intersects the part to be joined. In FIG. 11, two round or cable sections such as that shown at 84 and 85 are employed and both extend diagonally or corner-to-corner of the rectangular batting sections. This provides additional batting length around the parts to be joined to form the weld metal seal.

In FIG. 12, a cable or conductor 107 is being welded to a flat strip or tape 108 which is on the bottom. However, the hole 89 again intersects both parts at the point of joining. With the connection such as seen in FIG. 12, the surface 76 of the base block seen in FIG. 4 would be utilized.

With the fixture open, the simplified procedure of the system is simply to place the first gasket or batting on the refractory base, followed by the conductor which should run directly across the center. The second gasket or batting is placed on top of the first conductor in a similar fashion. Finally, the last or third gasket or batting is placed on top if required. With the holes in the gaskets or batting properly aligned, the fixture is closed compressing the layered batting and parts with enough pressure to contain the weld metal. The crucible is then charged and the weld metal ignited to form a fully penetrated, low resistance weld between the conductors or parts. It will also be appreciated that instead of being formed exothermically, molten metal may be cast into the weld chamber from a ladle, for example, either directly or through the crucible. When the weld is completed, the fixture is opened and the compressed batting is discarded.

Referring now to FIGS. 13 through 21, there is illustrated only a few of the various connections which may be made with the apparatus and fixture of the present invention. With each welded connection, there is illustrated schematically the number of refractory battings employed to form the disposable weld chamber.

Figure 13:
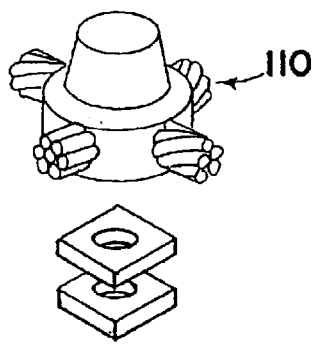
FIGS. 13–21 are fragmentary perspective views of a few of the various type of connections which can be made with the present invention, and for each there is a schematic illustration of the number of batting layers for the weld connection illustrated.

Referring initially to FIG. 13, there is illustrated a four-way cable connection which is illustrated at 110. The connection may be made with or without sleeving. As illustrated, only two refractory bats are required to form the cable-to-cable connection.

Figure 14:
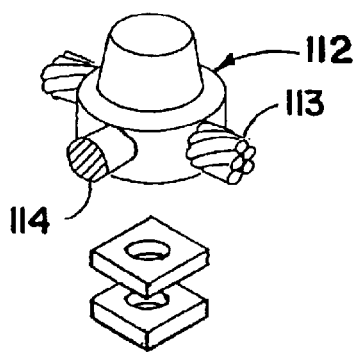

The connection 112 seen in FIG. 14 is between a cable 113 and a solid rod 114 in the general form of a capital "T." Again, the connection may be made with or without sleeving. As illustrated only two bats are required.

Figure 15:
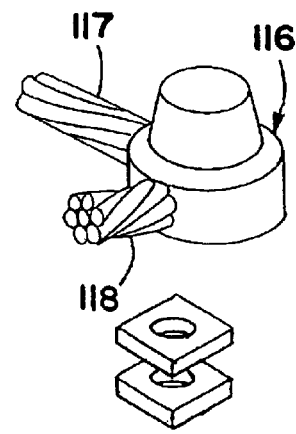

In FIG. 15, the connection 116 is made between cables 117 and 118 extending at approximate right angles to each other. Again, only two bats are required.

Figure 16:
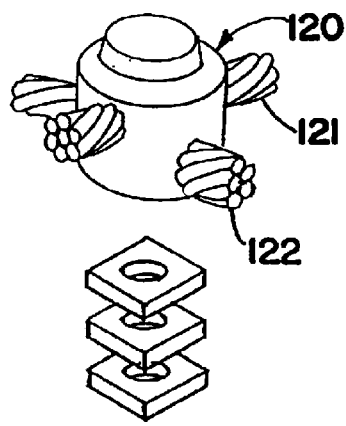

In FIG. 16, the connection 120 is formed between crossing cables 121 and 122. The connection may be formed with or without sleeving. In this connection, three bats are required as illustrated.

Figure 17:
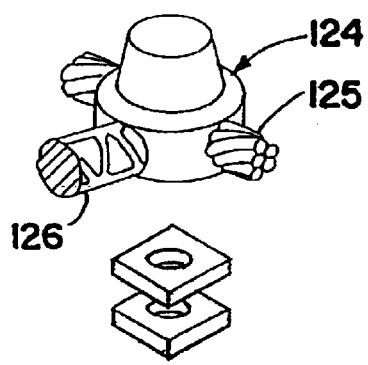

FIG. 17 illustrates a connection 124 between a cable 125 and a reinforcing bar 126. In this case, as illustrated, only two bats are required.

Figure 18:
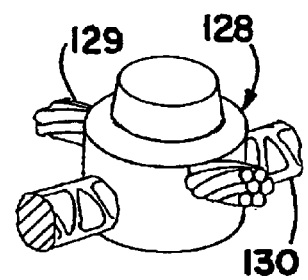
Figure 19:
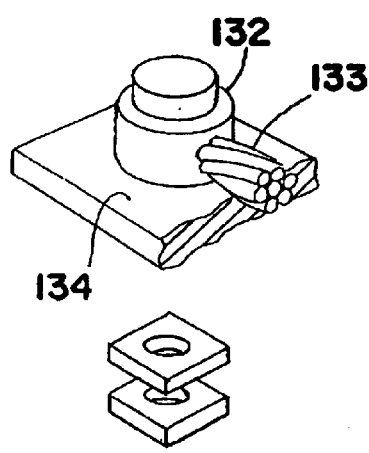

In FIG. 18, there is illustrated a connection 128 between a cable 129 and reinforcing bar 130. In the illustrated connection, three bats are required. In FIG. 19, there is illustrated a connection 132 between a cable 133 and a strip or tape 134. As illustrated, two bats are required.

Figure 20:
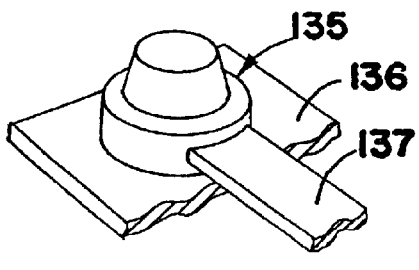

In FIG. 20, there is illustrated a connection 135 between a bottom larger tape 136 and a smaller top tape 137. For the connection illustrated, three bats are required.

Figure 21:
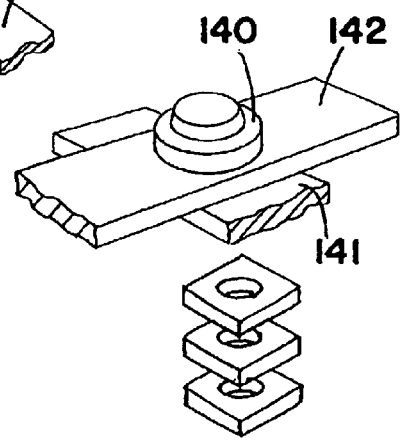

In FIG. 21, there is illustrated a connection 140 between a bottom tape or strip 141 and a top tape or strip 142. For the connection illustrated, three bats are required.

Although FIGS. 13 through 21 illustrate only nine types of connections, it will be appreciated that the apparatus of the present invention may produce many more types of connections utilizing the same basic materials or components of a kit. The kit may comprise in addition to the fixture, the crucible platen and the base block. The kit may also include two sets of thirty-three battings or gaskets in a plastic bag. The battings are normally provided with the hole die-cut in the center, but with the circular section formed by the die-cutting left in place. This helps to maintain the shape and stability of the high loft refractory felt or blanket material. The kit may also include two sets of ten weld metal containers such as shown at 99 in FIG. 8. The containers may all be the same size regardless of the type of connection made. The kit may also include the igniter and various cleaning tools for re-use of the crucible platen.

For example, one kit using the same size battings and the same size weld metal container may form high-quality weld connections between round conductors for solid copper up to 10 mm in diameter, cable copper up to 50 mm$^2$, and reinforcement bar up to 10 mm in diameter. The same kit may also form tape or strip connections between conductors up to 30×3 mm, steel tape up to 30×3 mm, and galvanized steel up to 30×3.5 mm. The kits and batting as well as the weld metal may also be supplied in larger sizes to cover a much larger range of connections, for example, cable and bars up to 120 mm$^2$ or larger, forming the high ampacity quality low resistance weld connections without the large mold inventory which is normally subject to wear and replacement costs. With the present invention, these costly dedicated molds have been replaced by a much more simplified system lowering the installation cost to the user as well as presenting a single solution for a large range of connections.

It will also be appreciated that vertically oriented connections may be made by orienting the fixture horizontally, providing the crucible platen with a tap hole having an elbow bend, and using a lower side surface of the crucible through which the tap hole exits as the platen surface. The parts and batting are then sandwiched in a vertical orientation. Also, by providing the base block with a hole or opening in which a ground rod, for example, may be seated, or an opening exposed to a steel plate or beam, connections directly to ground rods or such other objects may be made.

Although the invention has been shown and described with respect to certain preferred embodiments, it is obvious that equivalent alterations and modifications will occur to others skilled in the art upon the reading and understanding of this specification. It will be appreciated that suitable features in one of the embodiments may be incorporated in another of the embodiments, if desired. The present invention includes all such equivalent alterations and modifications, and is limited only be the scope of the claims.

What is claimed is:

1. A method of forming electrical connections comprising the steps of providing a base, layering batting and conductors to be welded against said base, said batting each having a hole intersecting the parts to be joined, compressing the layered batting and parts, to cause the batting to conform to the parts so that said holes form a weld chamber, and then introducing weld metal into the weld chamber to fuse the parts to provide a low resistance electrical connection.

2. A method as set forth in claim 1, wherein said layered batting and parts are compressed by a crucible platen, and forming the weld metal from an exothermic reaction in the crucible platen.

3. A method as set forth in claim 1, including the step of providing two or more layers of batting to form the weld chamber.

4. A method as set forth in claim 2, including the step of supporting said base and said crucible platen in a clamp fixture, and closing the clamp fixture to obtain such compression.

5. A method of forming electrical connections comprising the steps of providing a base, layering batting and conductors to be welded against said base, said batting each having a hole intersecting the parts to be joined, compressing the layered batting and parts, to cause the batting to conformed to the parts to form a weld chamber, and then introducing weld metal into the weld chamber to fuse the parts to provide a low resistance electrical connection, said batting being rectangular and provided with a central hole, with the parts to welded extending diagonally of the batting.

6. A method as set forth in claim 1, including the step of providing the base with a plurality of faces, each of the plurality having a different pattern to facilitate the formation of a different type weld when facing the batting.

7. A method as set forth in claim 1, including the step of maintaining the base, batting and parts in alignment as the layered batting and parts are compressed.

8. A method of forming welded connections comprising the steps of providing a base, layering refractory batting and the parts to be joined contiguous to the base, the batting layers each having a hole intersecting the parts to be joined, compressing the layered batting and parts against the base to cause the batting to conform to the parts so that said holes form a sealed weld chamber, and introducing weld metal into the chamber to form a molecular bond connection between the parts.

9. A method as set forth in claim 8, including the step of forming the weld metal exothermically in a crucible.

10. A method as set forth in claim 9, including the step of compressing the layered batting and parts with the crucible as a platen.

11. A method as set forth in claim 8, including the step of providing the base with a patterned face to assist in the formation of the welded connection.

12. A method as set forth in claim 11, including the step of providing the base with more than one face, each having a different pattern.

13. A method as set forth in claim 10, including the step of supporting the base and crucible in an alignment clamp.

14. Apparatus for forming weld connections comprising a base, a layered arrangement of batting and parts to be connected, means to compress said layered arrangement against the base, each batting having a hole intersecting the part to be connected, and means to introduce weld metal into the holes to fuse the parts together.

15. Apparatus as set forth in claim 14, wherein said means to introduce weld metal comprises a crucible.

16. Apparatus as set forth in claim 15, wherein said crucible comprises the means to compress the layered arrangement.

17. Apparatus as set forth in claim 15, wherein said crucible contains an exothermic reaction chamber for forming said weld metal, and a tap hole in said crucible communicating with the holes in said batting.

18. Apparatus as set forth in claim 16, including a clamp and alignment fixture for supporting said base and crucible for aligned clamping movement toward each other.

19. Apparatus as set forth in claim 14, including a pattern on said base to facilitate the formation of the weld connection.

20. Apparatus as set forth in claim 19, including more than one face on said base, each with a different pattern to facilitate the formation of different type weld connections.

21. Apparatus as set forth in claim 14, wherein said batting is rectangular and provided with a central hole.

22. Apparatus as set forth in claim 14, wherein said batting is a felt blanket of high temperature glass or other refractory material fibers.

23. Apparatus as set forth in claim 18, wherein said clamp and alignment fixture includes means to increase the pressure on the layered arrangement of batting and parts until a proper refractory seal has been formed around the parts to be connected.

24. A welding fixture for forming welded connections comprising a fixed base for supporting layered batting and parts to be connected, each batting layer having a hole intersecting the parts to be connected, a moveable platen adapted to be driven against the layered batting and parts to compress them against the fixed base, and means to introduce weld metal into the hole when the batting and parts are compressed to form the welded connection.

25. A fixture as set forth in claim 24, wherein said fixture includes an alignment guide for supporting said base, said alignment guide projecting beyond said base to support said layered batting and parts in alignment with said base and platen.

26. A method of forming welded comprising the step of providing a base, layering stacked refractory batts each with a chamber hole and parts to be welded, compressing the layered stacked assembly to cause the batts to compress around the parts to be joined so that the holes form with the parts a weld chamber, and then introducing molten metal into the chamber formed by the holes to weld the parts together.

27. A method as set forth in claim 26 including the step of compressing the layered stacked assembly with a movable platen.

28. A method as set forth in claim 28 including providing the movable platen with a hole, and using the hole to introduce molten metal into the chamber.

29. A welding fixture comprising a base, layers of refractory batting each having a hole positioned on the base, with the work to be welded interposed between the layers and extending across the holes so that the holes form a molten metal containing weld chamber when the layers of batting are compressed to contain molten metal introduced into the chamber to weld the parts, and means to compress the layers.

30. A welding fixture as set forth in claim 29 including a movable platen to compress the layers.

31. A welding fixture as set forth in claim 30 including a hole in the platen for introducing molten metal into the chamber.

32. A method as set forth in claim 5, including the step of forming the batting from a high loft felt of high temperature glass or other refractory fiber.

33. Apparatus for forming weld connections comprising a base, a layered arrangement of batting and parts to be connected, means to compress said layered arrangement against the base, each batting having a hole intersecting the part to be connected, and means to introduce weld metal into the holes to fuse the parts together, said batting being rectangular and provided with a central hole, said parts normally extending diagonally of the batting and intersecting the hole.

34. A welding fixture for forming welded connections comprising a fixed base for supporting layered batting and parts to be connected, each batting layer having a hole intersecting the parts to be connected, a moveable platen adapted to be driven against the layered batting and parts to compress them against the fixed base, and means to introduce weld metal into the hole when the batting and parts are compressed to form the welded connection, said fixture including a releasable ratchet clamp supporting a crucible, one surface of which acts as said platen.

35. A welding fixture for forming welded connections comprising a fixed base for supporting layered batting and parts to be connected, each batting layer having a hole intersecting the parts to be connected, a moveable platen adapted to be driven against the layered batting and parts to compress them against the fixed base, and means to introduce weld metal into the hole when the batting and parts are compressed to form the welded connection, including an upstanding ratchet bar, and a supporting plate at the bottom of said bar, said base projections from the bottom of said just above said plate and providing enhanced stability for the fixture to be supported in an upright position on substantially and surface.

\* \* \* \* \*